(12) United States Patent
Nichols et al.

(10) Patent No.: US 11,859,543 B2
(45) Date of Patent: Jan. 2, 2024

(54) DIFFUSER PIPE WITH EXIT FLARE

(71) Applicant: Pratt & Whitney Canada Corp., Longueuil (CA)

(72) Inventors: Jason Nichols, Mississauga (CA); Ryan Perera, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/967,501

(22) Filed: Oct. 17, 2022

(65) Prior Publication Data
US 2023/0193819 A1 Jun. 22, 2023

Related U.S. Application Data

(63) Continuation of application No. 16/429,606, filed on Jun. 3, 2019, now abandoned.

(51) Int. Cl.
| | |
|---|---|
| *F04D 29/28* | (2006.01) |
| *F02C 6/06* | (2006.01) |
| *F04D 29/44* | (2006.01) |
| *F02K 3/00* | (2006.01) |
| *F02C 7/32* | (2006.01) |

(52) U.S. Cl.
CPC ............ *F02C 6/06* (2013.01); *F02C 7/32* (2013.01); *F02K 3/00* (2013.01); *F04D 29/284* (2013.01); *F04D 29/288* (2013.01); *F04D 29/44* (2013.01); *F04D 29/441* (2013.01); *F05D 2220/32* (2013.01); *F05D 2250/52* (2013.01); *F05D 2250/71* (2013.01)

(58) Field of Classification Search
CPC ...... F04D 29/284; F04D 29/288; F04D 29/44; F04D 29/441; F02C 6/06; F02C 7/32; F02K 3/00; F05D 2220/32; F05D 2250/52; F05D 2250/71
See application file for complete search history.

(56) References Cited

U.S. PATENT DOCUMENTS

| | | | | |
|---|---|---|---|---|
| 2,641,442 A | * | 6/1953 | Buchi ...................... | F01D 9/02 415/206 |
| 3,289,921 A | * | 12/1966 | Soo ........................ | F04D 29/681 415/207 |
| 3,860,360 A | | 1/1975 | Yu | |
| 4,315,715 A | * | 2/1982 | Nishiguchi ............... | F01D 9/00 415/207 |
| 9,874,223 B2 | | 1/2018 | Theratil | |
| 11,286,952 B2 | * | 3/2022 | Mazur .................... | F04D 29/444 |

(Continued)

*Primary Examiner* — David E Sosnowski
*Assistant Examiner* — Theodore C Ribadeneyra
(74) *Attorney, Agent, or Firm* — Getz Balich LLC

(57) ABSTRACT

A diffuser pipe has a tubular body defining a pipe center axis extending therethrough. The tubular body includes a first portion extending in a generally radial direction from an inlet of the tubular body, a second portion extending in a generally axial direction and terminating at a pipe outlet, and a bend portion fluidly linking the first portion and the second portion. The tubular body has a length defined between the inlet and the pipe outlet. The tubular body has cross-sectional profiles defined in a plane normal to the pipe center axis. An area of the cross-sectional profile at the pipe outlet is at least 20% greater than an area of the cross-sectional profile at a point upstream from the pipe outlet a distance corresponding to 10% of the length of the tubular body.

17 Claims, 3 Drawing Sheets

(56) References Cited

U.S. PATENT DOCUMENTS

| | | | |
|---|---|---|---|
| 2003/0091439 A1* | 5/2003 | Rossi | F04D 29/30 |
| | | | 416/223 R |
| 2009/0317248 A1* | 12/2009 | Tanaka | F04D 29/441 |
| | | | 415/224.5 |
| 2010/0122531 A1* | 5/2010 | Capon | F04D 29/441 |
| | | | 60/605.1 |
| 2012/0171030 A1 | 7/2012 | Iino | |
| 2015/0226232 A1 | 8/2015 | Duong | |
| 2016/0108920 A1 | 4/2016 | Yamashita | |
| 2018/0073520 A1 | 3/2018 | Soeguet | |
| 2018/0328381 A1 | 11/2018 | Parker | |
| 2019/0293087 A1 | 9/2019 | Tamada | |
| 2020/0063753 A1* | 2/2020 | Higashimori | F04D 29/441 |
| 2020/0393129 A1* | 12/2020 | Duong | F01D 17/14 |
| 2021/0115943 A1* | 4/2021 | Koga | F04D 29/682 |
| 2022/0196031 A1* | 6/2022 | Iwakiri | F02C 6/12 |

* cited by examiner

US 11,859,543 B2

DIFFUSER PIPE WITH EXIT FLARE

This application is a continuation of U.S. patent application Ser. No. 16/429,606 filed Jun. 3, 2019, which is hereby incorporated herein by reference in its entirety.

TECHNICAL FIELD

The present application relates generally to centrifugal compressors for gas turbine engines, and more particularly to diffuser pipes for such centrifugal compressors.

BACKGROUND

Diffuser pipes are provided in certain gas turbine engines for diffusing a flow of high speed air received from an impeller of a centrifugal compressor and directing the flow to a downstream component, such as an annular chamber containing the combustor. The diffuser pipes are typically circumferentially arranged at a periphery of the impeller, and are designed to transform kinetic energy of the flow into pressure energy. Diffuser pipes seek to provide a uniform exit flow with minimal distortion, as it is preferable for flame stability, low combustor loss, reduced hot spots etc.

The diffuser pipes increase in cross-sectional area over their length, in order to provide diffusion of the air exiting the impeller. As the area gradually increases, and the flow within the pipe reduces in velocity, separation of the flow begins to occur within the diffuser pipe. The effectiveness of the diffuser is related to its ability to raise the static pressure while limiting the total pressure loss due to the diffusion.

SUMMARY

There is provided a compressor diffuser for a gas turbine engine, the compressor diffuser comprising: diffuser pipes having a tubular body defining a pipe center axis extending therethrough, the tubular body including a first portion extending in a generally radial direction from an inlet of the tubular body, a second portion extending in a generally axial direction and terminating at a pipe outlet, and a bend portion fluidly linking the first portion and the second portion, the tubular body having a length defined between the inlet and the pipe outlet, the tubular body having cross-sectional profiles defined in a plane normal to the pipe center axis, an area of the cross-sectional profile at the pipe outlet is at least 20% greater than an area of the cross-sectional profile at a point upstream from the pipe outlet a distance corresponding to 10% of the length of the tubular body.

There is provided a diffuser pipe comprising a tubular body defining a pipe center axis extending therethrough, the tubular body including a first portion extending in a generally radial direction from an inlet of the tubular body, a second portion extending in a generally axial direction and terminating at a pipe outlet, and a bend portion fluidly linking the first portion and the second portion, the tubular body having a length defined between the inlet and the pipe outlet, the tubular body having cross-sectional profiles defined in a plane normal to the pipe center axis, an area of the cross-sectional profile at the pipe outlet is at least 20% greater than the area of the cross-sectional profile at a last 10% of the length of the tubular body.

There is provided a method of increasing a static pressure of fluid exiting a centrifugal compressor of a gas turbine engine, the method including: conveying the fluid through a diffuser pipe to rapidly diffuse the fluid through a last 10% of a length of the diffuser pipe over which a cross-sectional area of the diffuser pipe increases by at least 20%.

BRIEF DESCRIPTION OF THE DRAWINGS

Reference is now made to the accompanying figures in which.

DETAILED DESCRIPTION

Figure 1:
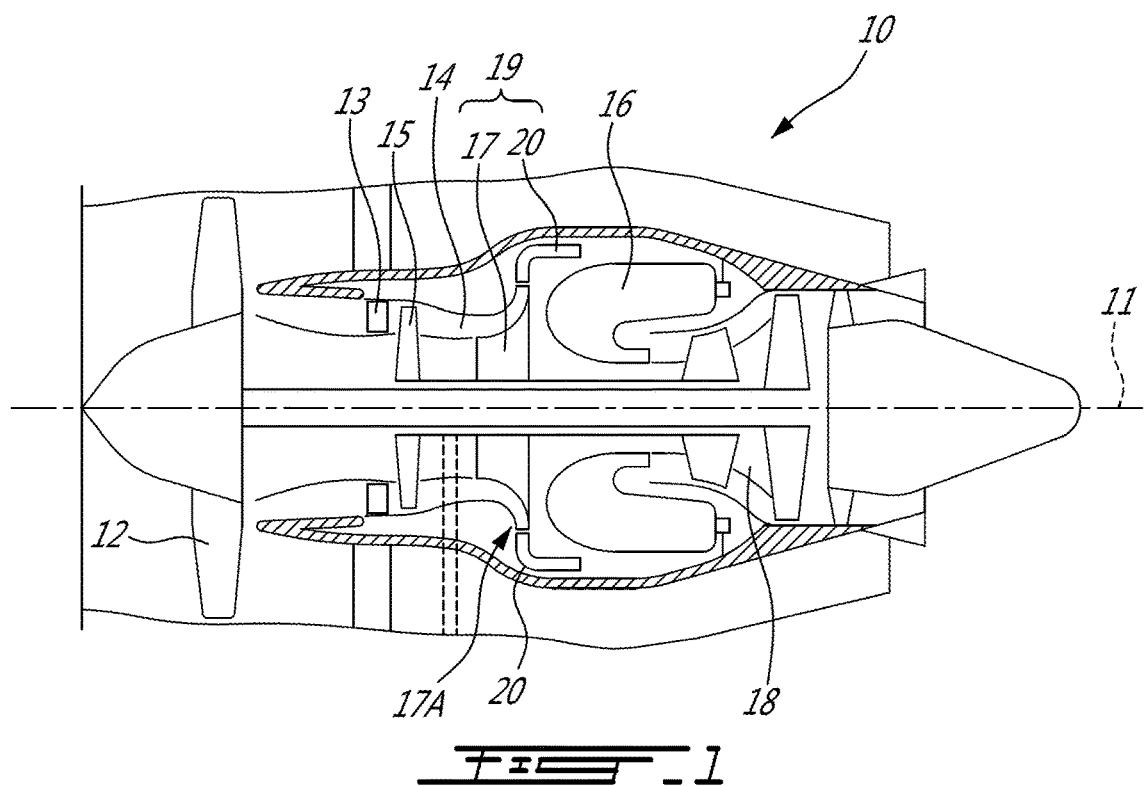
FIG. 1 is a schematic cross-sectional view of a gas turbine engine.

FIG. 1 illustrates a gas turbine engine 10 of a type preferably provided for use in subsonic flight, generally comprising in serial flow communication along an engine center axis 11 a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include a plurality of stators 13 and rotors 15 (only one stator 13 and rotor 15 being shown in FIG. 1), and it may include a centrifugal compressor 19.

The centrifugal compressor 19 of the compressor section 14 includes an impeller 17 and a plurality of diffuser pipes 20, which are located downstream of the impeller 17 and circumferentially disposed about a periphery of a radial outlet 17A of the impeller 17. The diffuser pipes 20 convert high kinetic energy at the impeller 17 exit to static pressure by slowing down fluid flow exiting the impeller. The diffuser pipes 20 may also redirect the air flow from a radial orientation to an axial orientation (i.e. aligned with the engine axis 11). In most cases, the Mach number of the flow entering the diffuser pipe 20 may be at or near sonic, while the Mach number exiting the diffuser pipe 20 may be less than 0.25 to enable stable air/fuel mixing, and light/re-light in the combustor 16.

Figure 2:
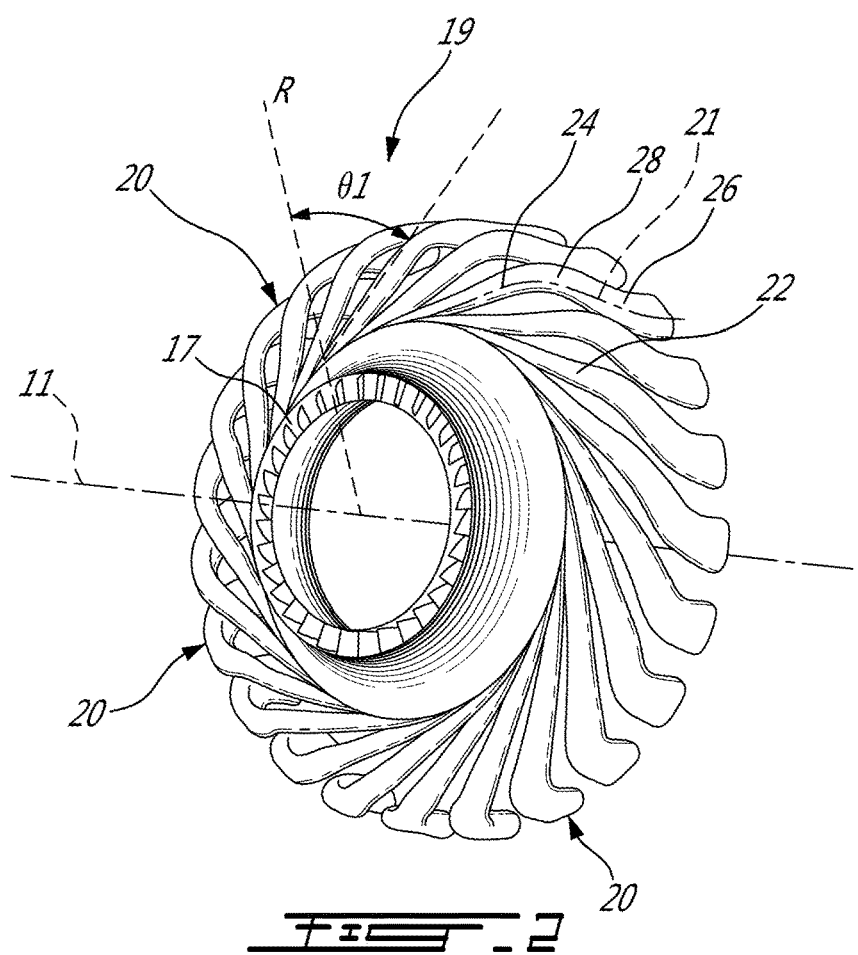
FIG. 2 is a perspective view of an impeller and diffuser pipes of a centrifugal compressor of the gas turbine of FIG. 1.

FIG. 2 shows the impeller 17 and the plurality of diffuser pipes 20, also referred to as "fishtail diffuser pipes", of the centrifugal compressor 19. Each of the diffuser pipes 20 includes a diverging (in a downstream direction) tubular body 22, formed, in one embodiment, of sheet metal. The enclosed tubular body 22 defines a flow passage 29 (see FIG. 3) extending through the diffuser pipe 20 through which the compressed fluid flow is conveyed. The tubular body 22 includes a first portion 24 extending generally tangentially from the periphery and radial outlet 17A of the impeller 17. An open end is provided at an upstream end of the tubular body 22 and forms an inlet 23 (see FIG. 3) of the diffuser pipe 20. The first portion 24 is inclined at an angle θ1 relative to a radial axis R extending from the engine axis 11. The angle θ1 may be at least partially tangential, or even substantially tangentially, and may further correspond to a direction of fluid flow at the exit of the blades of the impeller 17, such as to facilitate transition of the flow from the impeller 17 to the diffuser pipes 20. The first portion 24 of the tubular body 22 can alternatively extend more substantially along the radial axis R.

The tubular body 22 of the diffuser pipes 20 also includes a second portion 26, which is disposed generally axially and is connected to the first portion 24 by an out-of-plane curved or bend portion 28. An open end at the downstream end of the second portion 26 forms a pipe outlet 25 (see FIG. 3) of the diffuser pipe 20. Preferably, but not necessarily, the first portion 24 and the second portion 26 of the diffuser pipes 20 are integrally formed together and extend substantially uninterrupted between each other, via the curved, bend portion 28.

The large radial velocity component of the flow exiting the impeller 17, and therefore entering the first portion 24 of each of the diffuser pipes 20, may be removed by shaping the diffuser pipe 20 with the bend portion 28, such that the flow is redirected axially through the second portion 26 before exiting via the pipe outlet 25 to the combustor 16. It will thus be appreciated that the flow exiting the impeller 17 enters the inlet 23 and the upstream first portion 24 and flows along a generally radial first direction. At the outlet of the first portion 24, the flow enters the bend portion 28 which functions to turn the flow from a substantially radial direction to a substantially axial direction. The bend portion 28 may form a 90 degree bend. At the outlet of the bend portion 28, the flow enters the downstream second portion 26 and flows along a substantially axial second direction different from the generally radial first direction. By "generally radial", it is understood that the flow may have axial, radial, and/or circumferential velocity components, but that the axial and circumferential velocity components are much smaller in magnitude than the radial velocity component.

Similarly, by "generally axial", it is understood that the flow may have axial, radial, and/or circumferential velocity components, but that the radial and circumferential velocity components are much smaller in magnitude than the axial velocity component.

Figure 3:
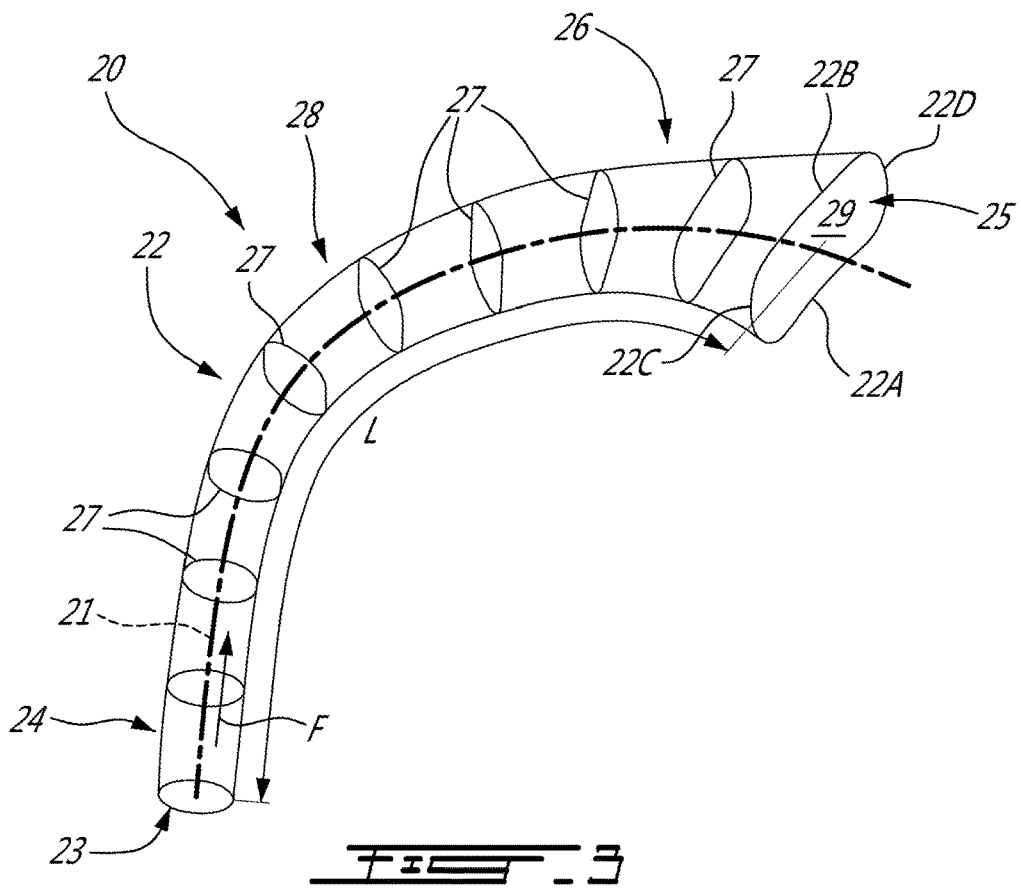
FIG. 3 is a perspective view of one of the diffuser pipes of FIG. 2.

Referring now to FIG. 3, the tubular body 22 of each diffuser pipe 20 has a radially inner wall 22A and a radially outer wall 22B. The tubular body 22 also has a first side wall 22C spaced circumferentially apart across the flow passage 29 from a second side wall 22D. The radially inner and outer walls 22A,22B and the first and second side walls 22C,22D meet and are connected to form the enclosed flow passage 29 extending through the tubular body 22. The radially inner and outer walls 22A,22B and the first and second side walls 22C,22D meet and are connected to form a peripheral edge of the tubular body 22 which circumscribes the pipe outlet 25. The radially inner wall 22A corresponds to the wall of the tubular body 22 that has the smallest turning radius at the bend portion 28, and the radially outer wall 22B corresponds to the wall of the tubular body 22 that has the largest turning radius at the bend portion 28.

The tubular body 22 diverges in the direction of fluid flow F therethrough, in that the internal flow passage 29 defined within the tubular body 22 increases in cross-sectional area between the inlet 23 and the pipe outlet 25 of the tubular body 22. The increase in cross-sectional area of the flow passage 29 through each diffuser pipe 20 is gradual over some of diffuser pipe 20 and more abrupt in parts of the second portion 26, as described in greater detail below. The direction of fluid flow F is along a pipe center axis 21 of the tubular body 22. The pipe center axis 21 extends through each of the first, second, and bend portions 24,26,28 and has the same orientation as these portions. The pipe center axis 21 is thus curved. In the depicted embodiment, the pipe center axis 21 is equidistantly spaced from the radially inner and outer walls 22A,22B of the tubular body 22, and from the first and second side walls 22C,22D, through the tubular body 22.

Still referring to FIG. 3, the tubular body 22 has a length L defined from the inlet 23 to the pipe outlet 25. The length L of the tubular body 22 may be measured as desired. For example, in FIG. 3, the length L is the length of the pipe center axis 21 from the inlet 23 to the pipe outlet 25. In an alternate embodiment, the length L is measured along one of the walls 22A,22B,22C,22D of the tubular body 22, from the inlet 23 to the pipe outlet 25. Reference is made herein to positions on the tubular body 22 along its length L. For example, a position on the tubular body 22 that is along a last 10% of the length L is anywhere in the segment of the tubular body 22 that is upstream of the pipe outlet 25 a distance equal to 10% of the length L. This same segment is also downstream of the inlet 23 a distance equal to 90% of the length L. Similarly, a position on the tubular body 22 that is along a first 90% of the length L is anywhere in the segment of the tubular body 22 that is downstream of the inlet 23 a distance equal to 90% of the length L. This same segment is also upstream of the pipe outlet 25 a distance equal to 10% of the length L.

The tubular body 22 is composed of many cross-sectional profiles 27 which are arranged or stacked one against another along the length L of the tubular body 22. Each cross-sectional profile 27 is a planar contour that lies in its own plane that is transverse or normal to the pipe center axis 21. FIG. 3 shows multiple cross-sectional profiles 27 in every portion 24,26,28 of the tubular body 22, and it will be appreciated that many more cross-sectional profiles 27 may be defined at other locations along the pipe center axis 21. In the depicted embodiment, the orientation of the cross-sectional profiles 27 in the frame of reference of the diffuser pipe 20 may vary over the length L of the tubular body 22, depending on where the cross-sectional profiles 27 are located along the pipe center axis 21. Each cross-sectional profile 27 defines the shape, contour, or outline of the tubular body 22 at a specific location along the pipe center axis 21.

Referring to FIG. 3, and as described in greater detail below, the cross-sectional profiles 27 vary over the length L of the tubular body 22. The cross-sectional profiles 27 are different over the length L of the tubular body 22. Each cross-sectional profile 27 may be unique, and thus different from the other cross-sectional profiles 27. An area of the cross-sectional profiles 27 varies along the length L of the tubular body 22. The area of a given cross-sectional profile 27 is defined between the inner, outer, first side, and second side walls 22A,22B,22C,22D in the cross-sectional profile 27. The area of the cross-sectional profiles 27 increases over the length L of the tubular body 22 in the direction of the pipe outlet 25. This is consistent with the diverging flow passage 29 defined by the tubular body 22.

Figure 4:
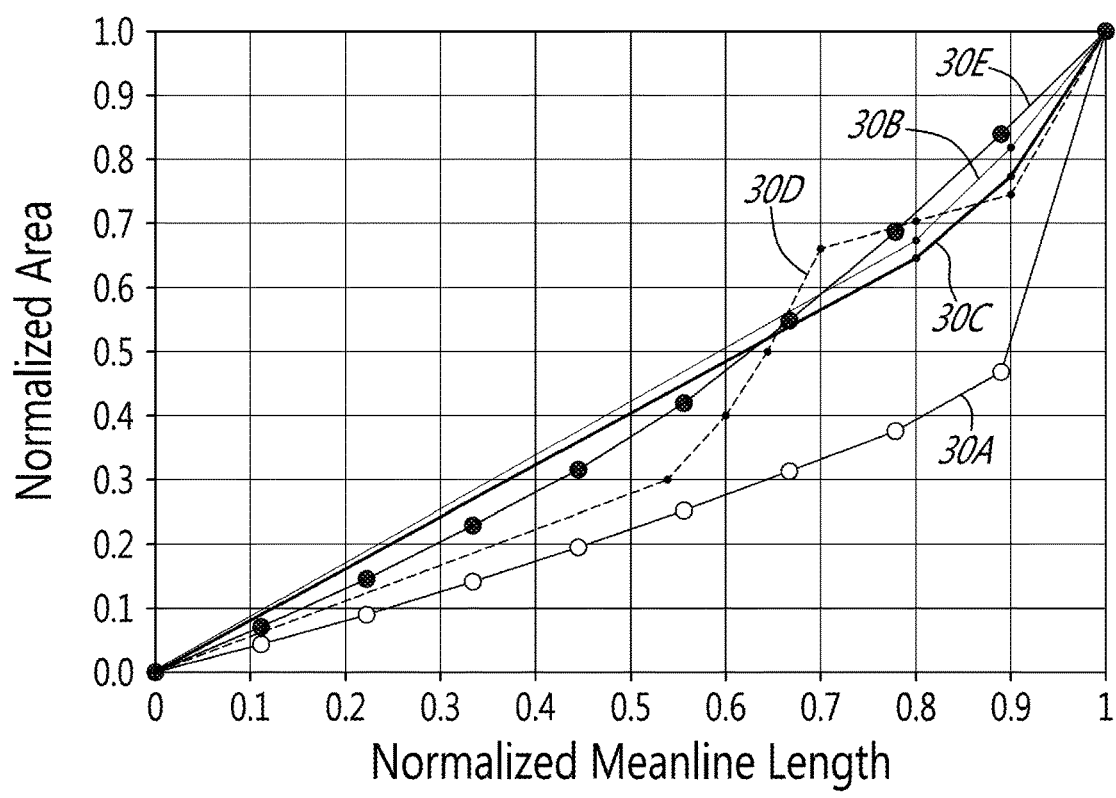
FIG. 4 is a graph plotting area at various locations along a length of a diffuser pipe, such as the one shown in FIG. 3.

FIG. 4 plots a normalized value for the area of the cross-sectional profiles 27 of the tubular body 22 at different points along the length L of the tubular body 22, where the length L is provided as a normalized meanline length. The "meanline" describes the locus of points from the inlet 23 to the pipe outlet 25 where each point is defined as the center of each section. A final value for the cross-sectional area of the tubular body 22 is defined at the pipe outlet 25, and is shown in FIG. 4 as corresponding to 100% of the normalized value for the area of the cross-sectional profile 27 at the pipe outlet 25. The final value is the highest value for the cross-sectional area of the tubular body 22. FIG. 4 shows the area curves for the tubular bodies 22 of diffuser pipes 20 with different area distributions along their lengths L. Referring to FIGS. 3 and 4, the tubular body 22 flares outwardly adjacent to the pipe outlet 25. More particularly, the area of the cross-sectional profiles 27 in the last 10% of the length L of the tubular body 22 increases by 20% or more. In FIG. 4, this is shown as the area of the cross-sectional profiles 27 going from about 50% of the final value to 100% of the final value, over the last 10% of the length L of the tubular body 22. The cross-sectional area of the diffuser pipe 20 thus increases rapidly in the last section of the diffuser pipe 20, right before the pipe outlet 25, thereby forming a diffuser pipe 20 which flares outwardly, like a trumpet, at the end portion thereof. The cross-sectional area of the diffuser pipe 20 does not increase after the pipe outlet 25, and achieves the final value at the pipe outlet 25. The diffuser pipe 20 therefore ends or terminates at the pipe outlet 25.

Referring to FIG. 4, the area curve 30A for the tubular body 22 in FIG. 3 shows that the area of the cross-sectional profile 27 at the pipe outlet 25 is more than 20% greater than the area of the cross-sectional profile 27 at a point or plane where the last 10% of the length L of the tubular body 22 begins. Stated differently, an area of the cross-sectional profile at the pipe outlet is at least 20% greater than an area of the cross-sectional profile at a point upstream from the pipe outlet a distance corresponding to 10% of the length of the tubular body. The area curve 30A for the tubular body 22 in FIG. 3 shows that the area of the cross-sectional profile 27 at the pipe outlet 25 is more than 25% greater than the area of the cross-sectional profile 27 at the beginning of the last 10% of the length L of the tubular body 22. In FIG. 4, this is shown as the area of the cross-sectional profiles 27 for the area curve 30A going from about 50% of the final value to 100% of the final value, over the last 10% of the length L of the tubular body 22. Thus, for the area curve 30A, the cross-sectional profiles 27 increase in area by 50% or more over the last 10% of the length L. For the area curve 30A, the area of the cross-sectional profile 27 at the pipe outlet 25 is more than 50% greater than the area of the cross-sectional profile 27 immediately upstream of the last 10% of the length L. Thus the area of the cross-sectional profiles 27 in the last 10% of the length L of the area curve 30A increases by more than 25%, or by at least 25%.

For the area curve 30A, the cross-sectional profiles 27 increase in area by at least 40% over the last 20% of the length L of the tubular body 22. In FIG. 4, this is shown as the area of the cross-sectional profiles 27 for the area curve 30A going from about 40% of the final value to 100% of the final value, over the last 20% of the length L of the tubular body 22. More particularly, the area of the cross-sectional profile 27 at the pipe outlet 25 in the area curve 30A is about 60% greater than the area of the cross-sectional profile 27 at the last 20% of the length L. The diffuser pipe 20 having the area curve 30A thereby undergoes an area change of at least 60% in the last 20% of the length L of the diffuser pipe 20. Indeed, and as shown in FIG. 4, the cross-sectional profiles 27 of the area curve 30A increase in area by more than 50% over the last 20% of the length L.

For the area curve 30A, the cross-sectional profiles 27 increase in area by at least 50% over the last 30% of the length L of the tubular body 22. For the area curve 30A, the cross-sectional profiles 27 increase in area by at least 50% over the last 25% of the length L of the tubular body 22. In FIG. 4, this is shown as the area of the cross-sectional profiles 27 for the area curve 30A going from about 33% of the final value to 100% of the final value, over the last 30% of the length L of the tubular body 22. The diffuser pipe 20 having the area curve 30A thereby undergoes an area change of at least 50% in the last 25% of the length L of the diffuser pipe 20.

The area curve 30A shows that the diffuser pipe 20 may undergo increases in the area of its cross-sectional profiles 27 of 50% or more in the last 10% of the length L of the diffuser pipe 20, in the last 20% of the length L of the diffuser pipe 20, and/or in the last 25% of the length L of the diffuser pipe 20.

Referring to FIG. 4, another possible area curve 30B for the tubular body 22 in FIG. 3 shows that the area of the cross-sectional profile 27 at the pipe outlet 25 is 20% greater than the area of the cross-sectional profile 27 at the last 10% of the length L of the tubular body 22. Thus the area of the cross-sectional profiles 27 in the last 10% of the length L of the area curve 30B increases by 20%. In FIG. 4, this is shown as the area of the cross-sectional profiles 27 for the area curve 30B going from about 80% of the final value to 100% of the final value, over the last 10% of the length L of the tubular body 22. Another possible area curve 30C for the tubular body 22 in FIG. 3 shows that the area of the cross-sectional profile 27 at the pipe outlet 25 is 33% greater than the area of the cross-sectional profile 27 at the last 20% of the length L of the tubular body 22. In FIG. 4, this is shown as the area of the cross-sectional profiles 27 for the area curve 30C going from about 66% of the final value to 100% of the final value, over the last 20% of the length L of the tubular body 22. The area curve 30D shows that the area of the cross-sectional profile 27 at the pipe outlet 25 is 33% greater than the area of the cross-sectional profile 27 at the last 30% of the length L of the tubular body 22. In FIG. 4, this is shown as the area of the cross-sectional profiles 27 for the area curve 30D going from about 66% of the final value to 100% of the final value, over the last 30% of the length L of the tubular body 22.

The increase in cross-sectional area of the diffuser pipe 20 over a short distance of the diffuser pipe 20 may allow for rapid diffusion at the exit of the diffuser pipe 20. This may lead to increased static pressure prior to providing the fluid flow F downstream into a plenum and ultimately into the combustion chamber of the combustor 16. Since diffusion occurs rapidly and over a short distance at the exit of the diffuser pipe 20, there may be lower pressure loss when compared to a conventional diffuser pipe where diffusion occurs over a more gradual increase in cross-sectional area. Thus the distribution of the cross-sectional area toward the exit of the diffuser pipe 20 may result in higher static pressure recovery and lower loss. The area curve 30E for such a conventional diffuser pipe, where diffusion occurs over a more gradual increase in cross-sectional area, is shown in FIG. 4. As can be seen, the cross-sectional area in the area curve 30E increases in a substantially linear manner over the length of the conventional diffuser pipe.

Still referring to FIG. 4, an upstream area of the diffuser pipe 20 has a more gradual increase in the area of the cross-sectional profiles 27. Referring to the area curves 30A,30B,30C, the cross-sectional profiles 27 increase linearly in area over an upstream segment of the tubular body 22 starting at 0% of the length L of the tubular body (i.e. at the inlet 23) and terminating at approximately 80% of the length L. The slope of the area curves 30A,30B,30C is substantially constant over the upstream segment. Thus, the tubular body 22 represented by the area curves 30A,30B, 30C increase gradually in cross-sectional area over the upstream segment. Stated differently, the increase in area of the diffuser pipe 20 represented by the area curves 30A, 30B,30C is much greater near the exit of the diffuser pipe 20 than further upstream within the diffuser pipe 20. Thus, diffusion occurs through a majority of the pipe length, and more diffusion occurs near the exit of the diffuser pipe 20. The upstream segment of the diffuser pipe 20 may also have other shapes and profiles.

As seen in FIG. 4, all of the area curves 30A, 30B, 30C, 30D, including the area curve 30E for the conventional diffuser pipe, have the same value for the area of their respective cross-sectional profiles 27 at the pipe outlet 25. In an embodiment, the radius of the diffuser pipe 20, its length L along the pipe center axis 21, and its overall area ratio are the same as that of the conventional diffuser pipe. The primary difference is that the diffuser pipe 20 performs less diffusion through a majority of the pipe length and more diffuser near the exit, compared to the conventional diffuser pipe.

Figure 5:
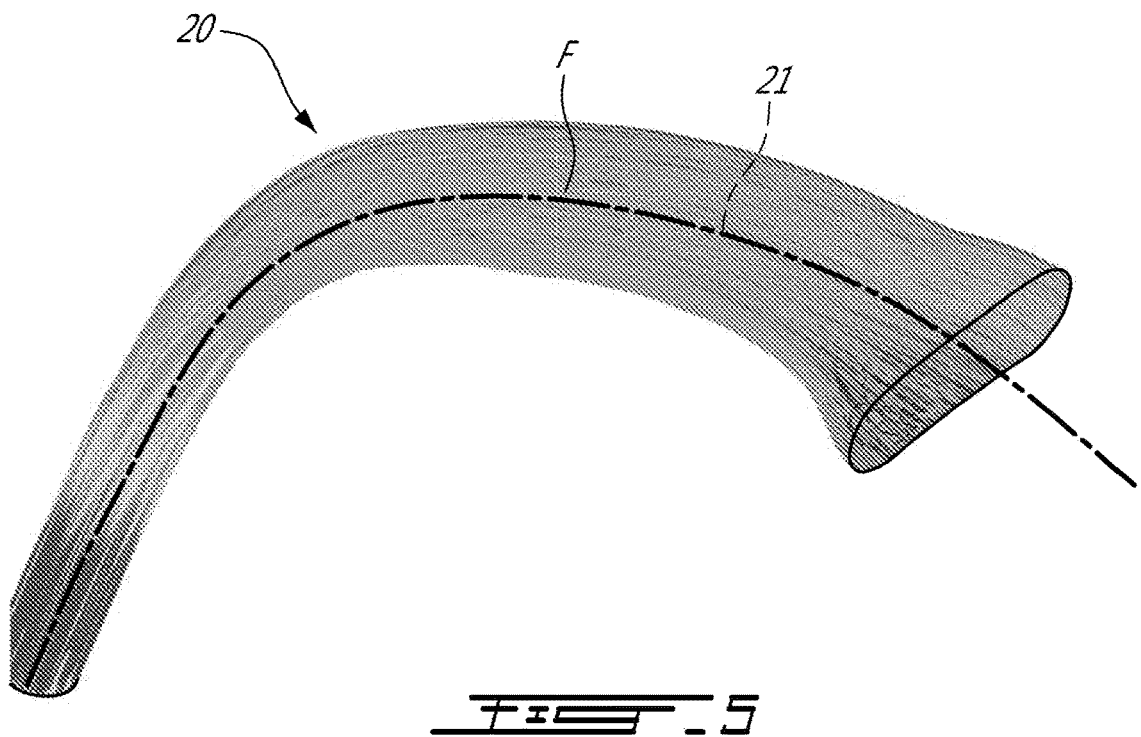
FIG. 5 shows examples of flow stream lines through the diffuser pipe of FIG. 3.

FIG. 5 shows possible lines of the fluid flow F through the diffuser pipe 20. As can be seen, the fluid flow F may remain clean and oriented parallel to the pipe center axis 21 through most of the diffuser pipe 20. The fluid flow F may be cleaner throughout upstream sections of the diffuser pipe 20 because of less diffusion, and there may be a reduction in separated fluid flow F near the exit. The exit flare of the diffuser pipe 20 may help to lower the average exit Mach number, may help to increases Cp (static pressure recovery), and/or may help to lower the omega ($\omega$) loss.

Figure 6:
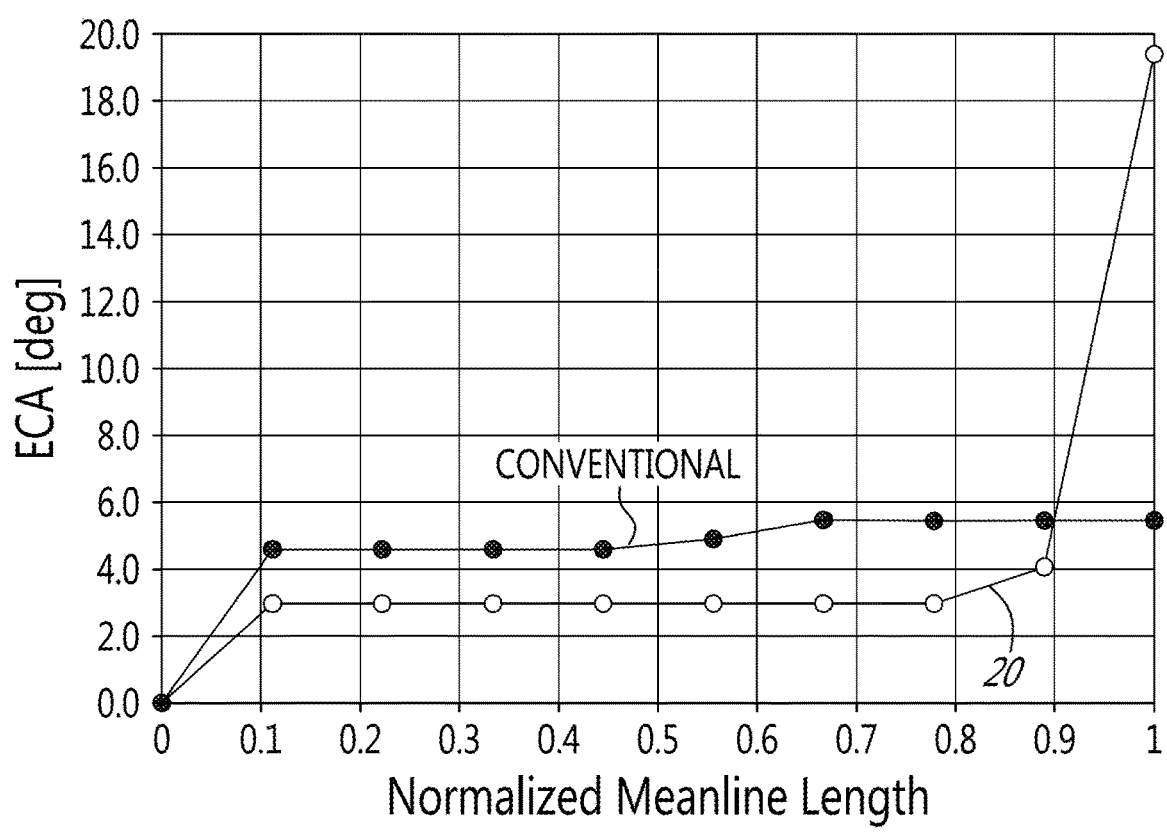
FIG. 6 is a graph plotting equivalent cone angle (ECA) at various locations along a length of a diffuser pipe, such as the one shown in FIG. 3.

FIG. 6 shows equivalent cone angle (ECA) plotted along the length L of the tubular body 22, where the length L is provided as a normalized meanline length. A larger ECA value is generally an indication of more diffusion and potentially more pressure loss. A lower ECA value is preferable when the flow path of the diffuser pipe 20 is turning (i.e. in the bend portion). A higher ECA value after the turning can indicate that flow is diffusing more efficiently. It can be seen that the diffuser pipe 20 has a lower ECA through most of the length L of the diffuser pipe 20 when compared to a conventional diffuser pipe, which contributes to lower diffusion and loss in the bend portion 28 of the diffuser pipe 20. Static pressure recovery (Cp), losses ($\omega$) and the ECA are determined according to the following formulae:

$$C_p = \frac{P_{s,outlet} - P_{s,inlet}}{P_{t,inlet} - P_{s,inlet}} \quad \omega = \frac{P_{t,inlet} - P_{t,outlet}}{P_{t,inlet} - P_{s,inlet}} \quad ECA = 2 \times \tan^{-1}\left(\frac{\sqrt{\frac{A_2}{\pi}} - \sqrt{\frac{A_1}{\pi}}}{L}\right)$$

Where Ps is the static pressure, Pt is the total pressure (Ps+pressure from kinetic energy), A1 is the cross-sectional area of diffuser pipe 20 at the inlet 23, A2 is the cross-sectional area of diffuser pipe 20 at the pipe outlet 25, and L is the meanline length of the diffuser pipe 20.

Referring to FIGS. 3 and 4, there is also disclosed a method of increasing static pressure of fluid at the combustor 16. The method includes conveying the fluid through the diffuser pipe 20 to rapidly diffuse the fluid through a last 10% of the length L, over which a cross-sectional area of the diffuser pipe 20 increases by at least 20%.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A centrifugal compressor for a gas turbine engine, comprising:
   an impeller configured for rotation about an axially extending axis of rotation;
   a plurality of diffuser pipes positioned around an outer circumference of the impeller and configured to receive fluid flow exiting the impeller, each diffuser pipe including a tubular body having:
   an open inlet end and an open outlet end;
   a first portion, a second portion, and a bend portion, the first portion extending in a generally radial direction relative to the impeller axis of rotation between the inlet end and the bend portion, and the second portion extending in a generally axial direction between the outlet end and the bend portion;
   a center axis that extends along a length of the tubular body between the inlet end and the outlet end;
   wherein the tubular body has an interior cross-sectional area defined by a plane normal to the center axis, and the interior cross-sectional area at the outlet end is equal to an outlet end area (OEA); and
   wherein the interior cross-sectional area of the tubular body increases linearly at a first rate for about eighty percent (80%) of the length of the tubular body starting at the inlet end; and
   wherein in a remaining about twenty percent (20%) of the length of the tubular body, the interior cross-sectional area of the tubular body increases by an amount equal to or greater than about thirty-three percent (33%) of said OEA.

2. The centrifugal compressor of claim 1, wherein in the remaining about twenty percent (20%) of the length of the tubular body, the interior cross-sectional area of the tubular body increases by an amount of at least sixty percent (60%) of said OEA.

3. The centrifugal compressor of claim 2, wherein in a ten percent (10%) of the length of the tubular body extending from the outlet end toward the inlet end, the interior cross-sectional area of the tubular body increases by an amount of about fifty percent (50%) of said OEA.

4. The centrifugal compressor of claim 1, wherein in a ten percent (10%) of the length of the tubular body extending from the outlet end toward the inlet end, the interior cross-sectional area of the tubular body increases linearly at a second rate greater than the first rate.

5. The centrifugal compressor of claim 4, wherein in the ten percent (10%) of the length of the tubular body extending from the outlet end toward the inlet end, the interior cross-sectional area of the tubular body increases by an amount of about fifty percent (50%) of said OEA.

6. The centrifugal compressor of claim 1, wherein the interior cross-sectional area of the tubular body separated from the inlet end in a direction toward the outlet end by a distance that is equal to about eighty percent (80%) of the length of the tubular body, the interior cross-sectional area of the tubular body is equal to or less than forty percent (40%) of said OEA.

7. The centrifugal compressor of claim 1, wherein the interior cross-sectional area of the tubular body separated from the inlet end in a direction toward the outlet end by a distance that is equal to about ninety percent (90%) of the length of the tubular body, the interior cross-sectional area of the tubular body is equal to or less than fifty percent (50%) of said OEA.

8. A gas turbine engine having a center axis, comprising: a combustor section; and a centrifugal compressor having an impeller configured for rotation the center axis, and a plurality of diffuser pipes positioned around an outer circumference of the impeller and configured to receive fluid flow exiting the impeller, each diffuser pipe including a tubular body having:

an open inlet end and an open outlet end;

a first portion, a second portion, and a bend portion, the first portion extending in a generally radial direction relative to the impeller axis of rotation between the inlet end and the bend portion, and the second portion extending in a generally axial direction between the outlet end and the bend portion;

a center axis that extends along a length of the tubular body between the inlet end and the outlet end;

wherein the tubular body has an interior cross-sectional area defined by a plane normal to the center axis, and the interior cross-sectional area at the outlet end is equal to an outlet end area (OEA); and wherein the interior cross-sectional area of the tubular body increases linearly at a first rate for about eighty percent (80%) of the length of the tubular body starting at the inlet end; and wherein in a remaining about twenty percent (20%) of the length of the tubular body, the interior cross-sectional area of the tubular body increases by an amount equal to or greater than about thirty-three percent (33%) of said OEA;

wherein the second portion of each of the plurality of diffuser pipes is oriented to direct the fluid flow axially into the combustor section.

9. The gas turbine engine of claim 8, wherein in the remaining about twenty percent (20%) of the length of the tubular body, the interior cross-sectional area of the tubular body increases by an amount of at least sixty percent (60%) of said OEA.

10. The gas turbine engine of claim 9, wherein in a ten percent (10%) of the length of the tubular body extending from the outlet end toward the inlet end, the interior cross-sectional area of the tubular body increases by an amount of about fifty percent (50%) of said OEA.

11. The gas turbine engine of claim 8, wherein in a ten percent (10%) of the length of the tubular body extending from the outlet end toward the inlet end, the interior cross-sectional area of the tubular body increases linearly at a second rate greater than the first rate.

12. The gas turbine engine of claim 11, wherein in the ten percent (10%) of the length of the tubular body extending from the outlet end toward the inlet end, the interior cross-sectional area of the tubular body increases by an amount of about fifty percent (50%) of said OEA.

13. The gas turbine engine of claim 8, wherein the interior cross-sectional area of the tubular body separated from the inlet end in a direction toward the outlet end by a distance that is equal to about eighty percent (80%) of the length of the tubular body, the interior cross-sectional area of the tubular body is equal to or less than forty percent (40%) of said OEA.

14. The gas turbine engine of claim 8, wherein the interior cross-sectional area of the tubular body separated from the inlet end in a direction toward the outlet end by a distance that is equal to about ninety percent (90%) of the length of the tubular body, the interior cross-sectional area of the tubular body is equal to or less than fifty percent (50%) of said OEA.

15. A centrifugal compressor for a gas turbine engine, comprising:

an impeller configured for rotation about an axially extending axis of rotation;

a plurality of diffuser pipes positioned around an outer circumference of the impeller and configured to receive fluid flow exiting the impeller, each diffuser pipe including a tubular body having:

an open inlet end and an open outlet end;

a first portion, a second portion, and a bend portion, the first portion extending in a generally radial direction relative to the impeller axis of rotation between the inlet end and the bend portion, and the second portion extending in a generally axial direction between the outlet end and the bend portion;

a center axis that extends along a length of the tubular body between the inlet end and the outlet end;

wherein the tubular body has an interior cross-sectional area defined by a plane normal to the center axis, and the interior cross-sectional area at the outlet end is equal to an outlet end area (OEA); and wherein the interior cross-sectional area of the tubular body increases linearly for about eighty percent (80%) of the length of the tubular body starting at the inlet end and the tubular body has a linear equivalent cone angle (ECA) from about ten percent (10%) of the length of the tubular body to about said eighty percent (80%) of the length of the tubular body, and has a said ECA greater than about six degrees from about ninety percent (90%) of the length of the tubular body to the outlet end of the tubular body.

16. The centrifugal compressor of claim 15, wherein the tubular body has an ECA that increases from about six degrees at about eighty percent (80%) of the length of the tubular body, and has a said ECA greater than about sixteen degrees at the outlet end of the tubular body.

17. The centrifugal compressor of claim 16, wherein the tubular body has an ECA of about nineteen degrees at the outlet end of the tubular body.

* * * * *